July 28, 1959
P. C. WALTERS ET AL
2,896,528
PATTY-FORMER AND COOKER
Filed March 29, 1957
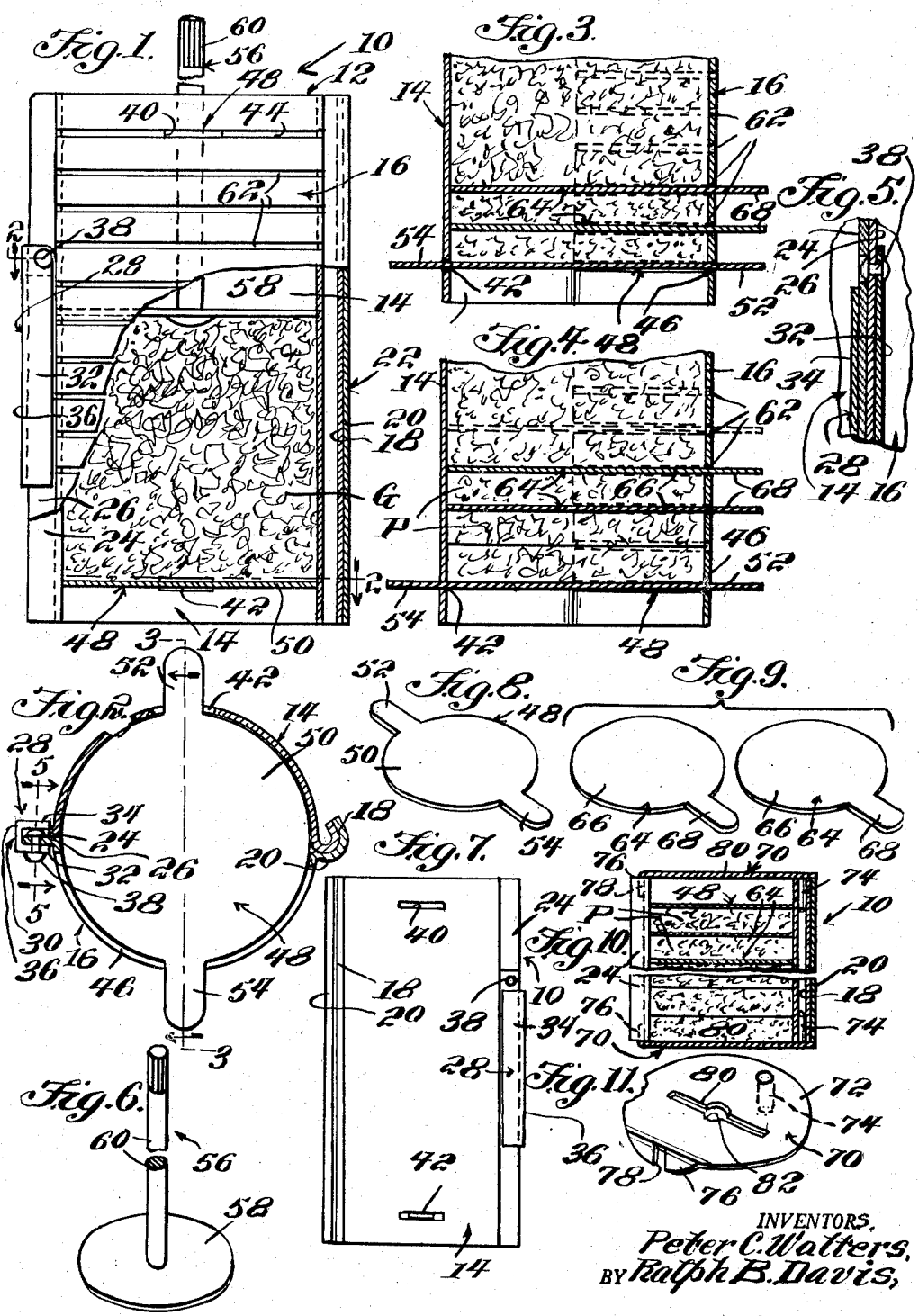
INVENTORS.
Peter C. Walters,
BY Ralph B. Davis,
McMorrow, Berman & Davidson
ATTORNEYS

United States Patent Office 2,896,528
Patented July 28, 1959

2,896,528

PATTY-FORMER AND COOKER

Peter C. Walters, Hamilton Square, and Ralph B. Davis, Trenton, N.J.

Application March 29, 1957, Serial No. 649,524

2 Claims. (Cl. 99—436)

This invention relates to an improved patty former and cooker for producing at one time a plurality of independent separable patties of mastic material, such as ground meat or the like, ready for removal and cooking or cookable therein, or ready for removal therefrom and freezing for subsequent cooking thereof.

Because of the availability of deep freezers, many housewives procure relatively large quantities of ground meat and the like, for freezing therein and subsequent use, and when meat is thus frozen in bulk it must be thawed out before it can be formed into patties for cooking. However, many housewives desire to form the bulk meat into patties and to store the patties in deep freeze so that such patties can subsequently be cooked while still in a substantially frozen state, so that the patties retain their juices.

The primary object of the invention is to provide a more practical and efficient patty former for readily and expeditiously forming a plurality of uniform patties of ground meat or the like, which can be removed from the former and frozen as described above, or can be cooked together in the former without removal thereof from the former.

Another object of the invention is to provide, in a patty former and cooker of the character indicated, means whereby the same may be readily and expeditiously cleaned to facilitate maintenance thereof in a sanitary state.

A further object of the invention is to provide a patty former and cooker of the character indicated which can be readily and economically manufactured, is easily used and maintained, and is highly satisfactory and acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a side elevation of a device of the invention, partly broken away and in section, to show interior structure and a quantity of such as ground meat therein;

Figure 2 is a horizontal section taken substantially on the plane of line 2—2 of Figure 1;

Figure 3 is a fragmentary vertical transverse section taken substantially on the plane of line 3—3 of Figure 2;

Figure 4 is a view similar to Figure 3;

Figure 5 is an enlarged fragmentary vertical transverse section taken substantially on the plane of line 5—5 of Figure 2;

Figure 6 is a contracted perspective view, on a reduced scale, of a packing plunger and cleaner;

Figure 7 is a side elevation, on a reduced scale, of a section of the device;

Figure 8 is a perspective view, on a reduced scale, of a removal end plate;

Figure 9 is a group perspective view, on a reduced scale, of divider plates;

Figure 10 is a contracted vertical transverse section, on a reduced scale, taken through the device and showing adapter plates connected therewith and adapting the device for use on such as a rotary spit; and, Figure 11 is a perspective view, on a reduced scale, of an adapter plate.

Referring to the drawings in detail, the illustrated device of the invention, indicated generally at 10, comprises an elongated hollow body, indicated generally at 12, of any suitable material. The body 12 is composed of two complementary semi-circular cross section first and second sections 14 and 16. The sections 14 and 16 have along related side edges thereof laterally outwardly projecting complementary semi-circular and telescopically engaged hook flanges 18 and 20, respectively, which provide a separable hinge connection for the sections. On the other longitudinal side edges of the sections 14 and 16 are laterally outwardly projecting flat flanges 24 and 26, respectively.

A locking lever 28 comprises an elongated channel 30 having opposed side flanges 32 and 34 connected by a web 36. The side flange 32, see Figure 5, is longer than the side flange 34 and extends beyond the adjacent end of the side flange 34, when the side flange 32 is traversed by a pivot 38 which traverses also the flange 26 of the section 16, so that the locking lever 28 can be pivoted from the closed position shown in Figures 1, 2 and 7, wherein the lever 28 embraces and locks the flanges 25 and 26 together and thereby locks the sections 14 and 16 together, to an open position in which the sections 14 and 16 are freed to be swung away from each other on the hook flanges 18 and 20.

The section 14 has in its side wall transversely elongated relatively short slots 40 and 42 which are located near the ends of the section 14 and are spaced from the flanges 18 and 24. The section 16 has in its side wall and in coplanar relationship to the slots 40 and 42, long slots 44 and 46, respectively, which extend between and to the flanges 20 and 26 of the section 16.

The device further comprises end plates 48 having flat disc bodies 50 conforming in diameter to the interior of the body 12, and having extending from opposite sides thereof diametrically opposed tabs or lugs 52 and 54, arranged to be removably engaged in coplanar slots 40 and 44, and 42 and 46, of the sections 14 and 16, as clearly seen in Figure 1. After one of the end plates has been put in place, the body 12 is filled with mastic material such as ground meat or the like, indicated at G, through the other end of the body 12.

Indicated generally at 56 is a packing plunger and cleaner or scraper, which comprises a circular disc 58 conforming in diameter to the interior of the body 12, and having secured at its center an elongated handle rod 60. As shown in Figure 1, the packing plunger 56 is utilized for packing the ground meat G in the body 12. Following use of the device 10, the plunger 56 can be reciprocated in the body 12 so as to scrape and clean the inner sides of the sections 14 and 16, preparatory to washing or otherwise cleansing the same.

After the ground meat is properly packed within the body 12, a second end plate 58 is inserted in the end of the body 12 opposite the first mentioned end plate, with its tabs engaged in the coplanar slots 40 and 44. The section 16 has in its side wall between its long slots 44 and 46 and equally spaced therefrom and from each other, a plurality of long intermediate slots 62. Divider plates 64 having circular bodies 66, conforming in diameter to the interior of the body 12, are provided for insertion into the body 12 through the intermediate slots 62, and have on the edges thereof handle lugs 68. After the meat has been packed in the body 12, and the end plates 48 installed, the divider plates 64 are passed through the slots 62 into the body 12, so as to divide the body of meat therein and form separate identical patties P, between end plates 48 and adjacent divider plates 64 and between adjacent divider plates.

With patties formed as described, the end plates and divider plates can be left in place and the assembled device subjected to heat in any suitable manner, so as to cook the patties therein.

Thereafter the sections 14 and 16 may be separated by disengaging the locking lever 28 and opening the sections, and the patties removed for consumption. If the patties are to be frozen and stored instead of being cooked, the sections 14 and 16 are opened and the patties removed and suitably wrapped and placed in a home freezer or the like.

The device of the invention further includes adapter means, shown in Figures 10 and 11, whereby the device can be mounted on a rotating spit (not shown) for cooking the meat in the device. The adapter means comprises adapter plates 70, one of which is shown in Figure 11, which comprises circular discs 72 to be engaged with opposite ends of the body 12. The adapted plates 70 have on their inward sides eccentric positioning pins 74 arranged to be engaged in related ends of the hook flange 18 of the section 14, see Figure 10. On the edges of the plates 70 diametrically opposite to the pins 74 are flanges 76 extending beyond the inner sides of the plates 70 and having intermediate notches 78 in their outer edges which are aligned with the pins 74. The notches 78 are arranged to receive therein the related ends of the flanges 24 and 26 of the sections 14 and 16, as shown in Figure 10. The discs 72 of the adapter plates have therein diametrical slots 80 which intersect larger diameter holes 82 in the centers of the discs 72, for receiving related ends of a spit or the like.

When the patties P are cooked within the device 10, the natural juices thereof will be retained, and a highly desirable and palatable end product results.

The foregoing is considered as illustrative only of the principles of the invention. Since numerous modification and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. A portable and manually operated patty former and cooker comprising a tubular body having a side wall and open ends, substantially semi-circular slots formed in and encircling one side of said side wall, said slots being spaced from each other and from the ends of the body, divider plates comprising disc bodies passed through said slots and fitting within said body, and handle means on the edges of the disc bodies projecting beyond the side wall for withdrawing the divider plates through the slots, and closure means for the ends of the body comprising diametrically opposed short slots in the body side wall at the ends of the body, and closure discs fitting the interior of the body having diametrically opposed lugs on their edges engaged in related short slots.

2. A portable and manually operable patty former and cooker comprising an elongated hollow body having opposite ends and composed of first and second semi-circular sections having first and second longitudinal side edges, hinge means on said first side edges hinging the sections together, locking means mounted on a section at the second side edge thereof and engageable with portions of the second side edges for releasably locking the sections together, said first section having a substantially imperforate side wall, said second section having a side wall provided with transversely elongated slots extending between its side edges, said slots being substantially equally spaced from each other and from the ends of said body, removable divider plates inserted through said slots across the interior of said body and serving to divide a mass of plastic material in said body into uniform patties, the side walls of said sections having relatively short slots near their ends which are coplanar and diametrically opposed to each other, and closure plates comprising disc bodies conforming in diameter to the interior of the body and having diametrically opposed lugs on their edges, the disc bodies being engageable in the opposite ends of the body with their lugs removably in related short slots.

References Cited in the file of this patent

UNITED STATES PATENTS

| 1,182,040 | Ritthamer | May 9, 1916 |
| 1,477,548 | De Muth | Dec. 18, 1923 |
| 2,564,298 | Costello | Aug. 14, 1951 |
| 2,705,450 | Steinbook | Apr. 5, 1955 |
| 2,717,415 | Gerhart | Sept. 13, 1955 |

FOREIGN PATENTS

| 527,271 | Canada | July 3, 1956 |